March 13, 1962 R. C. BARRON ETAL 3,024,576
BUFFING MACHINE
Filed April 3, 1959 5 Sheets-Sheet 1
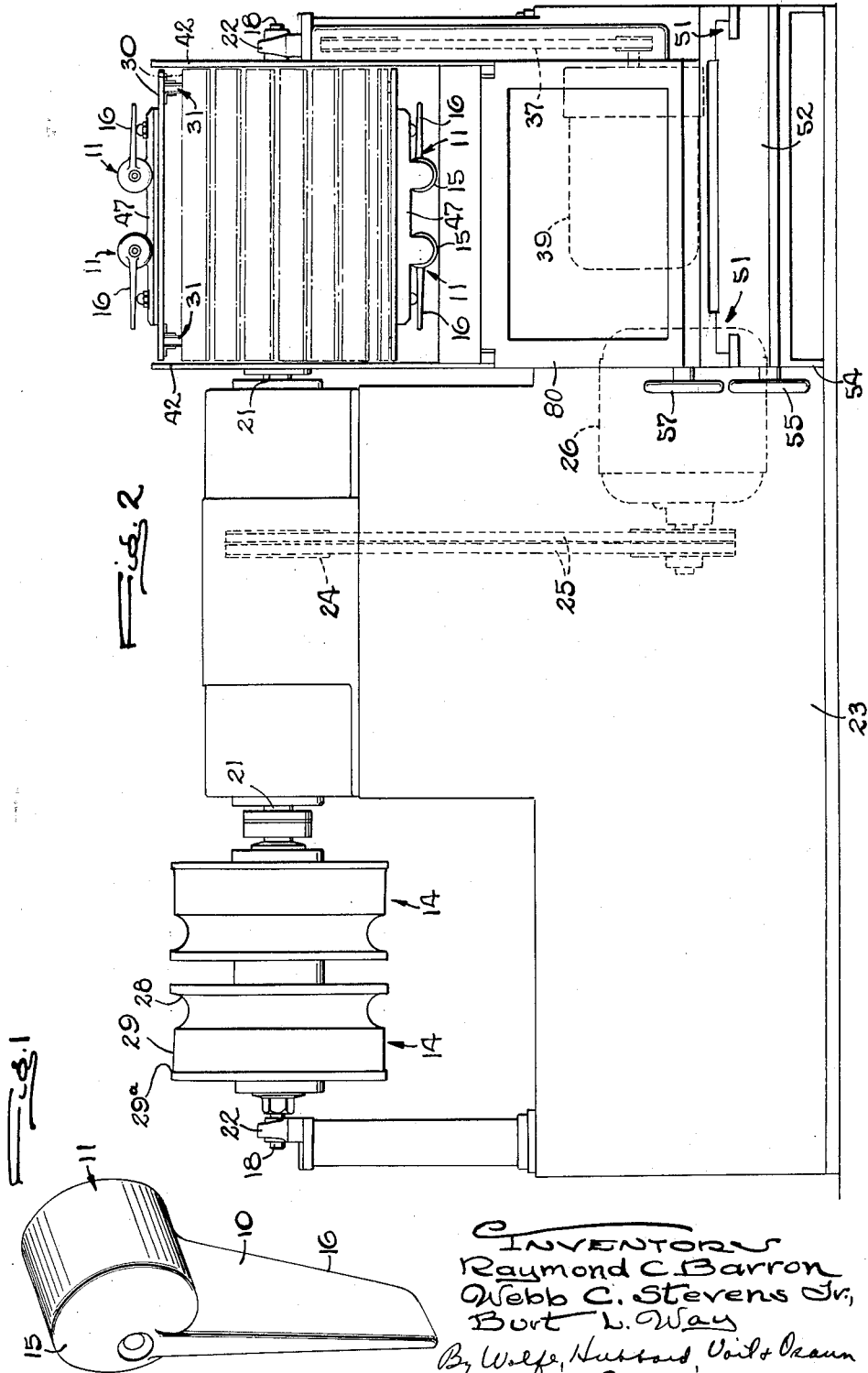

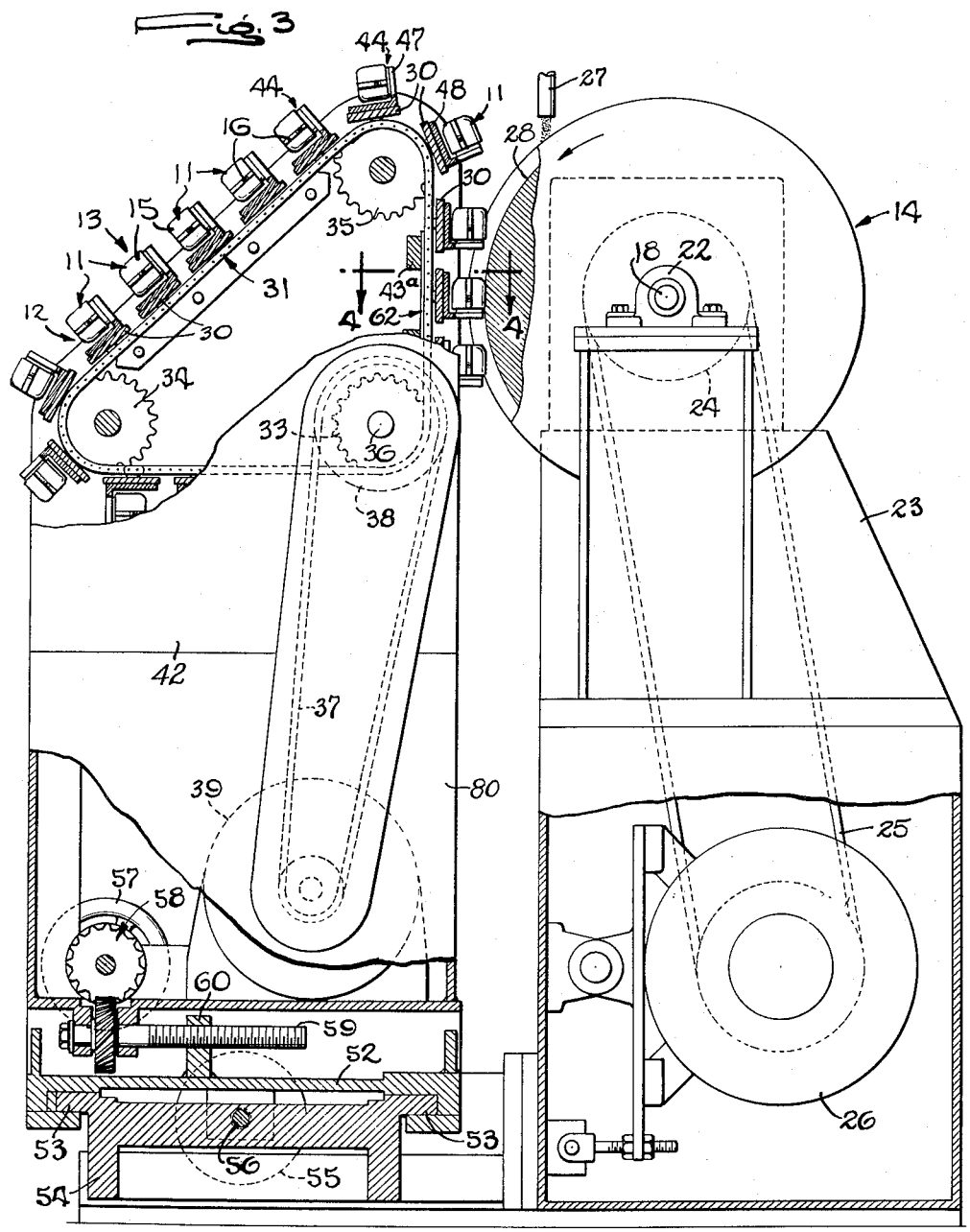

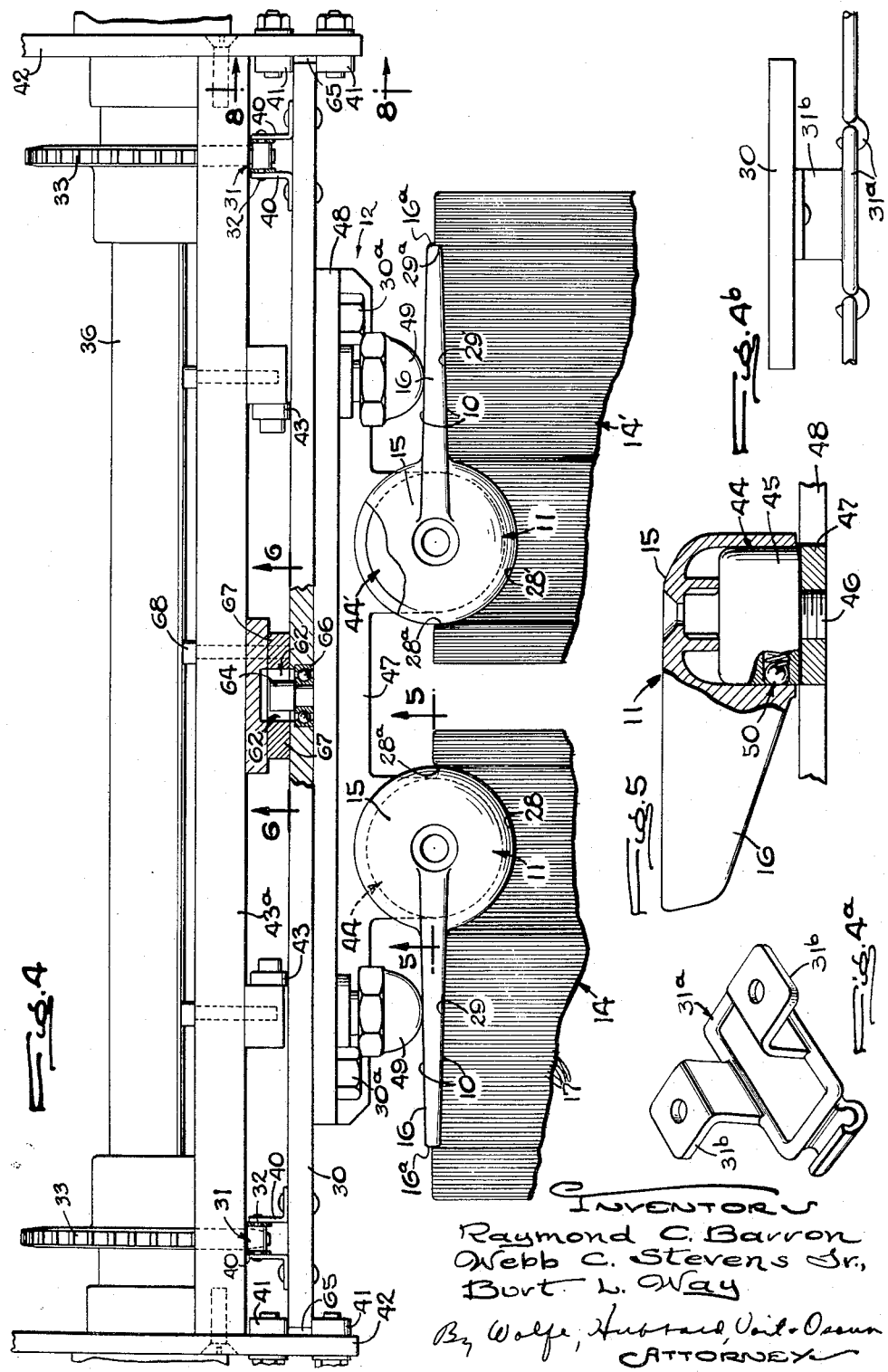

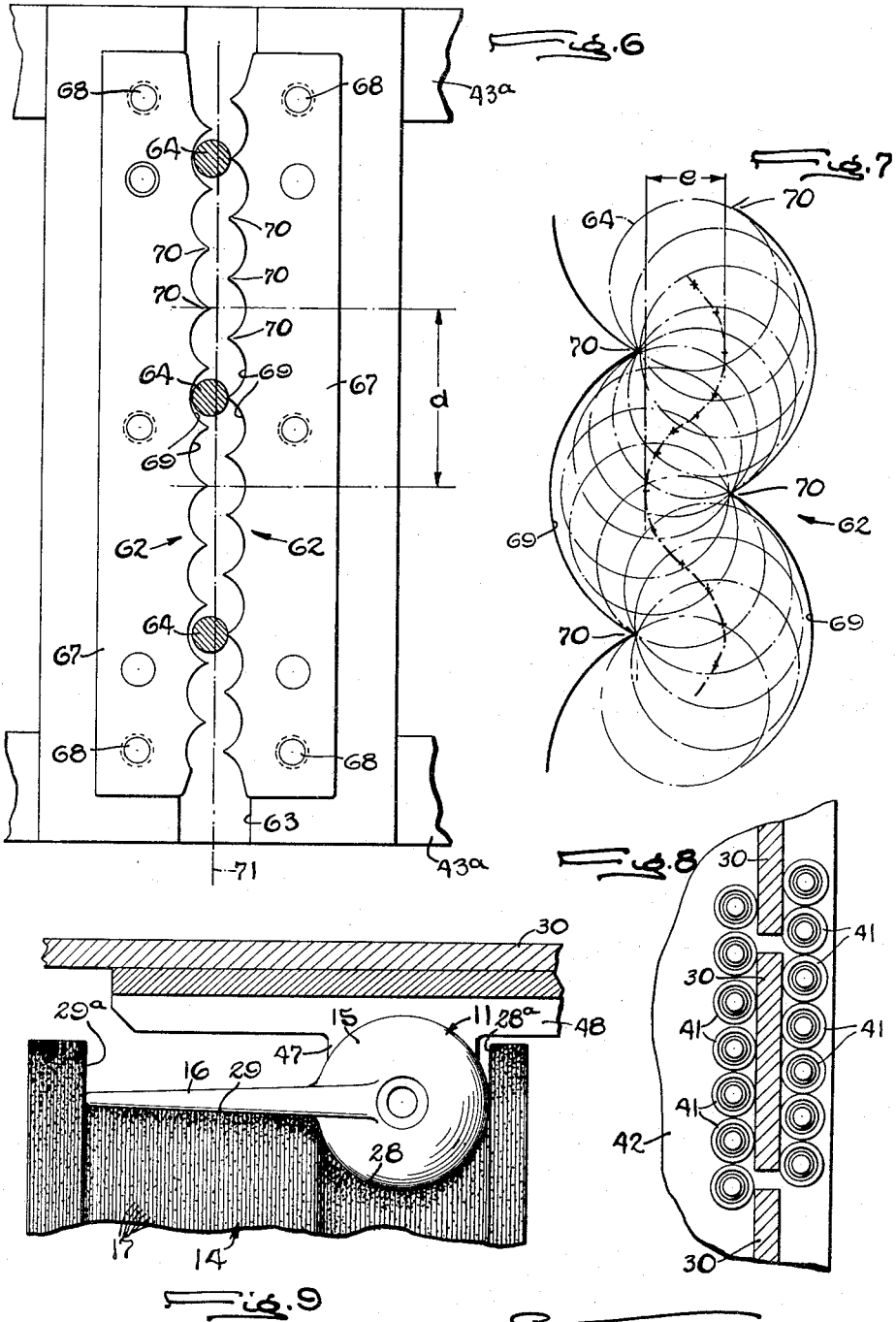

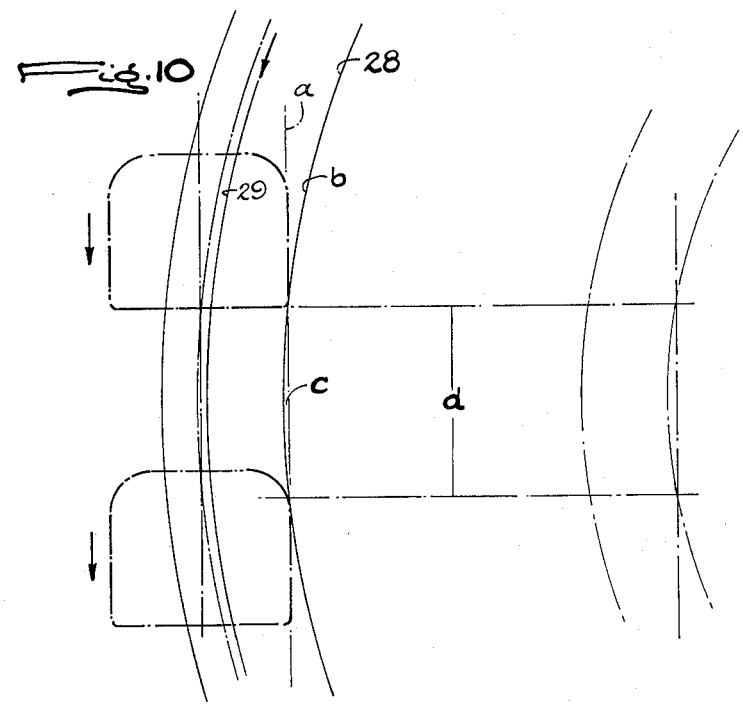
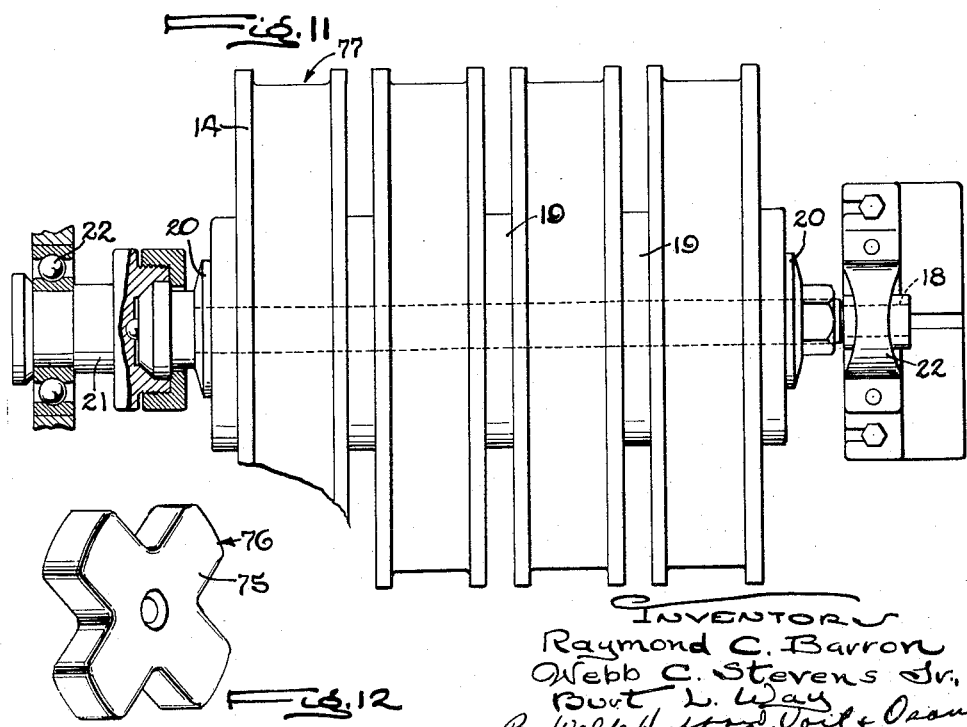

United States Patent Office 3,024,576
Patented Mar. 13, 1962

3,024,576
BUFFING MACHINE
Raymond C. Barron, Webb C. Stevens, Jr., and Burt L. Way, Rockford, Ill., assignors to Quality Metal Finishing Co., Byron, Ill., a corporation of Illinois
Filed Apr. 3, 1959, Ser. No. 803,886
7 Claims. (Cl. 51—76)

This invention relates to the automatic buffing of work surfaces of irregular or non-planar contour while the workpieces are supported on an endless conveyor and moved tangentially of the periphery of a laminated fabric buffing wheel to bring said surface into contact with a wheel periphery over an arc of substantial length.

The general object is to provide a machine for automatically buffing work surfaces of irregular contour at a substantially lower cost of both labor and materials and with a uniformly finer finish and polish than has been possible either by hand or with the machines heretofore available.

A more detailed object is to contour the buffing wheel to complement the shape of the work surface and to shift the work back and forth in a novel manner during its close mating contact with the wheel periphery.

The invention also resides in the manner of supporting the work in contact with the wheel and shifting the same back and forth along the wheel axis.

Other objects and advantages of the invention will become apparent from the following detailed description taken in connection with the accompanying drawings, in which:

FIGURE 1 is a perspective view of a workpiece typical of those which may be buffed in accordance with the present invention.

FIG. 2 is a fragmentary elevational view of a buffing machine embodying the novel features of the present invention.

FIG. 3 is an end view with parts of the machine broken away and shown in section.

FIG. 4 is a fragmentary section taken along the line 4—4 of FIG. 3.

FIG. 4ª is a perspective view of one link of a preferred form of chain link.

FIG. 4ᵇ is a fragmentary side view of the work conveyor chain.

FIG. 5 is a fragmentary view of the work fixture shown in section along the line 5—5 of FIG. 4.

FIG. 6 is a fragmentary section taken along the line 6—6 of FIG. 4.

FIG. 7 is a diagrammatic enlargement of part of FIG. 6.

FIG. 8 is a fragmentary section taken along the line 8—8 of FIG. 4.

FIG. 9 is a view of part of FIG. 4 after partial wearing of the buffing wheel.

FIG. 10 is a diagrammatic view illustrating the progress of a workpiece across the buffing wheel.

FIG. 11 is a fragmentary plan view partially in section showing a buffing wheel contoured to polish a workpiece of the type shown in FIG. 12.

FIG. 12 is a perspective view of the workpiece to be buffed by the wheel shown in FIG. 11.

In the drawings, the invention is shown incorporated in a machine for buffing opposite side surfaces 10 of a workpiece 11 while the latter is supported on an endless power driven conveyor 13 and carried thereby tangentially past and in close contact with a short arc of the periphery of a buffing wheel 14. The typical workpiece illustrated in FIGURE 1 comprises a hollow dome shaped hub 15 on one end of a flat handle 16 which tapers somewhat toward its free end in the plane of the hub axis.

As usual, the buffing wheel (see FIGS. 4 and 11) comprises a multiplicity of fabric disks 17 threaded onto a spindle 18 and compressed between rings 19 of smaller diameter by clamping abutments 20 one of which is screw actuated. A plurality of such wheels may be arranged end to end on the spindle whose opposite ends are coupled detachably to shafts 21 journaled in bearings 22 on the top of a suitable frame 23. The extended end of one shaft carries pulleys 24 (FIG. 2) for driving of the wheel at the desired speed through belts 25 driven by a motor 26 mounted on the frame.

In accordance with accepted practice the periphery of the buffing wheel is coated with a suitable polishing compound which preferably is applied as a liquid sprayed onto the wheel from a suitable nozzle 27 (FIG. 3). The spray is directed against the wheel in advance of the point of contact with the work.

The present invention contemplates contouring the periphery of the wheel to complement the surface 10 to be buffed so that the latter mates closely with the wheel surface during the buffing engagement. Thus, as shown in FIG. 4, the fabric disks are cut away to provide a groove 28 of arcuate cross-section complementing one side of the dome 15 and a flat bottomed groove 29 for engaging one side of the handle 16 when the dome is seated in the groove 28. Where, as in the case of the end 16ª of the handle, an area of the surface to be buffed is disposed in a plane normal to the wheel axis, the wheel groove is made of sufficient depth to provide side to side engagement between such surface and the wheel disk defining the side wall 29ª of the groove.

The grooves may be turned in the periphery of the wheel while the spindle thereof is mounted in a lathe unit which may be built into the buffing machine. As shown at the left in FIG. 1, the wheel spindle is mounted in suitable tail and head stocks with the latter coupled to the pulleys 24. Of course, the tool employed in the turning operation is formed with a cutting edge corresponding in shape to the desired cross-sectional contour of the groove.

Buffing of one work surface 10 is effected by moving the workpiece tangentially past the wheel periphery along a rectilinear path $a$ (FIG. 10) which includes a chord of the circle $b$ described by the contoured buffing surfaces 28 and 29, such chord being spaced radially and inwardly from the circle $b$ a distance $c$, which for most workpieces is about 1/16 of an inch at the start of the buffing operation. As a result of such slight depression of the wheel, the contact pressure between the work and wheel surfaces is very light, and the engagement of the two surfaces extends over a relative short area $d$, for example, about 1½ inches. During such engagement, the workpiece is held in full mating relation relative to the contoured surfaces as shown in FIG. 4 so that each point on the surface to be buffed is in engagement with the wheel under substantially the same pressure and for substantially the same length of time.

To the foregoing ends, the workpieces 11 are seated on fixtures 12 secured to cross-bars 30 spaced along an endless conveyor formed by the bars and two laterally spaced endless belts which in the present instance take the form of chains 31 which, as shown in FIGS. 3 and 4, are of the roller type with the adjacent links joined by pivot pins 32 spaced to impart a uniform pitch to the chain. Preferably, the chains are of the slip link type shown in FIGS. 4ª and 4ᵇ with generally rectangular links 31ª, certain of which are equipped with wings 31ᵇ projecting from opposite sides. The two chains extend around and mesh with the teeth of sprockets 33, 34 and 35 fast on shafts 36 which span the side walls of the machine frame and are spaced to support the chains in the form of triangles with one side inclined upwardly between the idle sprockets 34, 35 and a second side disposed vertically between the sprockets 35, 33 which are located above and below the axis of the buffing wheel and in front of the latter. Through a chain 37 meshing with a sprocket 38 on the shaft of the sprockets 33, the latter are power rotated by a motor 39.

Opposite ends of each cross-bar 30 are fastened to the chains through angle brackets 40 riveted to the extended ends of certain of the pivot pins 32 as shown in FIG. 4 or riveted directly to the wings 31$^b$ in the preferred construction as shown in FIG. 4$^a$. The bars are spaced equidistantly along the chains at intervals each of which, for a purpose to appear presently, is an even multiple of the pitch of the chains. While being advanced downwardly past the buffing wheel, each cross-bar 30 is guided and held accurately in a vertical plane. This is accomplished by two rows of rollers 41 (FIGS. 4 and 8) spaced along vertical plates 42 at opposite ends of the cross-bars and engageable with opposite ends of the cross-bars and engageable with opposite sides of the bars. During contact between the buffing wheel and the workpieces carried by any one of the bars 30, the latter is backed intermediate its ends by rollers 43 on a cross-bar 43$^a$ (FIGS. 3 and 4) joining the plates 42 and cooperating with the latter to form a frame on the top of a box-like base 80 (FIGS. 2 and 3).

Each bar carries one or more fixtures 44 in which the workpieces are held removably in a position to present the surface to be buffed in proper mating relation with respect to the grooves of the wheel. With the workpiece shown in FIG. 1, each fixture includes a rigid knob 45 adapted to fit loosely with the dome of the workpiece and is fastened as by a screw 46 to the upstanding flange 47 of an angle bar 48. The latter is clamped by screws 30$^a$ against the outer surface of the cross-bar 30 and in this instance carries stops 49 for backing and properly locating the handle 16 of the work. The dome 15 of the work is pressed down over the knob 45 and held thereon frictionally as by a spring loaded ball detent 50.

To enable the surfaces of the passing workpieces to mate fully with the surfaces 28 and 29 and engage the wheel periphery to the desired depth in spite of wearing away of the wheel, the base 80 of the frame 42 of the conveyor is supported through suitable guides 51 (FIG. 2) on a slide 52 which in turn is guided along cross-ways 53 (FIG. 3) on a base 54. By turning a hand wheel 55 (FIG. 2) on a screw 56, the supporting base 80 of the conveyor frame and the work conveyor thereon may be adjusted along the axis of the wheel to bring workpieces in the fixtures 44 directly opposite the wheel grooves 28, 29. Feeding of the workpieces to the desired depth into the wheel is effected by turning a hand wheel 57 mounted on the conveyor frame and operating through gears 58, a screw 59, and a nut 60 on the slide 52 to shift the conveyor and workpieces radially toward or away from the wheel axis.

It is well known in the buffing art that streaking of the buffed surface may be avoided by shifting the work back and forth laterally along the wheel axis, uniformity of the buffing pressure being achieved ordinarily by virtue of the cylindrical contour of the wheel periphery. We have discovered that shifting of the work to avoid such streaking may be achieved in spite of the contoured character of the wheel described above and without destroying the wheel contour as the fabric wears away provided that the range of reciprocation is so short, that is no more than 5/32 of an inch, as to be accommodated by lateral bending of the disks 17 defining the ends of the wheel groove thus avoiding slipping of the work surfaces across the edges of these disks. In addition, the present invention contemplates correlating with this short range of reciprocation, the frequency of the latter and the pressure of the contact between the work and buffing wheel periphery so as to provide a uniform polish over the entire area of the work while minimizing the rate of wearing off of the wheel and also preserving the desired wheel contour as the fabric wears away.

In the present instance, the reciprocatory motion is derived from the traveling conveyor through stationary cams 62 (FIGS. 3, 4, 6 and 7) acting on followers 64 on the cross-bars 30 to shift the latter back and forth endwise as permitted by lateral flexure of the conveyor chains 31 and the clearances 65 at the ends of the bars. Each follower 64 comprises a pin having one end pressed into the inner race ring of a ball-bearing 66 pressed into a hole in the cross-bar at the center thereof. The follower pin projects into the cam track which extends along the path of travel of the workpiece while engaging the wheel and is defined by the opposed edges of bars 67 secured by bolts 68 to the frame bar 43$^a$.

As shown in FIGS. 6 and 7, each cam edge comprises a series of arcs 69 staggered relative to the arcs on the opposed cam with the adjacent arcs intersecting at points 70. Each of the latter is spaced, as shown in FIG. 7, from the adjacent point on the opposite cam a distance only slightly greater than the diameter of the follower 64. The chains 31 are straight and unbent when the follower is disposed on the center line 71 (FIG. 6) of the cam track. Thus, as the follower approaches one of the points 70, it is cammed over center as permitted by lateral bending of the chains which are thus tensioned somewhat. Maximum flexing of the chains occurs as the follower passes one of the points 70 after which the motion of the follower and workpiece is reversed immediately under the tension of the chains. Then, about the time the follower reaches the center line 71, it is picked up by the rise of the opposite arc 69 and forced over center toward the bottom of the next arc. In this way, the follower and workpiece are reciprocated back and forth without appreciable dwelling at any point in the repeated strokes even after substantial wearing of the cam points 70. This desirable action and the successive positions taken by the follower 64 in moving along the cam track are illustrated in FIG. 7, the workpiece being shifted back and forth within the range $e$ as indicated by the dotted line.

By spacing the adjacent points 70 of the two cam bars a distance only slightly greater than the diameter of the follower 64 it is possible to reciprocate the workpiece back and forth more than four times and preferably at least six times as in the present instance while the workpiece is passing through the working range $d$ and is in active buffing contact with the wheel surface. Thus, in spite of the shortness of the reciprocatory stroke, the workpiece is shifted back and forth rapidly and, this together with the substantial elimination of dwells at the ends of the stroke, has been found to avoid any noticeable streaking of the polished surface either along lines paralleling or extending diagonally of the path of travel of the work.

To prevent objectionable stressing of the chains 31 during their lateral flexure, provision is made for movement of the guided lengths of the chains in the same directions. This is accomplished by spacing the followers 64 along the chains uniformly and separating the adjacent followers by a distance which is an even multiple of the pitch of the links of the chains. The full lengths of the vertical runs of the chains are thus moved back and forth in unison by the cams and through such a short range $e$ as to avoid objectionable bending of the chains.

By a novel arrangement of fixtures on the conveyor, the labor cost of buffing of a plurality of different sides of a workpiece may be reduced substantially as compared to prior methods. To accomplish this, one or more additional buffing wheels 14' are mounted on the spindle 18 and contoured on their peripheries to complement the second or third work surfaces to be polished. In the case of the workpiece 11 which is similiarly contoured on opposite sides, a second wheel 14' is formed with grooves 28', 29' to mate with the second side 10 when the work is mounted on a fixture 44' carried by the other end of the cross-bar 30 for projection of the work handle 16 outwardly and in a direction opposite handle of the workpiece in the first fixture 44.

With both fixtures on each bar 30 loaded, the two workpieces will be buffed on opposite sides as their supporting bar passes the two wheels 14 and 14'. Then, as these pieces again become exposed on the upwardly moving run of the conveyor, both pieces are removed from their fixtures and the left or partially buffed piece is placed on the right hand fixture 44' while an unbuffed piece is placed in the proper position on the left hand fixture 44. In this way, the two sides of such workpiece are polished in two successive excursions of the conveyor past the buffing wheels thereby avoiding the necessity of handling and storing the pieces after each partial buffing operation. By thus progressing the work from station to station across the conveyor, a proportionately greater saving in labor is achieved as the number of different surfaces to be polished on the workpiece is increased.

Operation

In operation of the machine above described, buffing wheels about 17 inches in diameter when new are grooved to contours approximately complementing those of the work surfaces to be polished. The surfaces 69 of the cam track are shaped to provide about six complete oscillations of the work relative to the wheels starting before the work contacts the wheel and continuing until it passes out of contact with the wheel, the range $e$ of reciprocation of the work preferably being about $3/32$ of an inch and in any case no more than $5/32$. After preliminary coating of the grooved surface with polishing compound discharged in liquid form from the spray nozzle 27, the handwheel 55 is adjusted to radially aline the work surfaces to be polished with the wheel groove and thus adapt their surfaces for full mating contact with the bottoms of these grooves. Then, the conveyor support is advanced toward the wheel axis by turning of the handwheel 57 thus positioning the work for depression of the wheel periphery by the passing work surface to a depth $c$ which, as above described, is preferably about $1/16$ of an inch. This dimension determines the length of the range $d$ of engagement between the work and the wheel which is usually rotated at about 2000 r.p.m. The rate of travel of the conveyor past the buffing wheel varies with the different workpieces and usually is about four feet per minute.

With the workpieces loaded in the fixtures and transferred progressively from one to the other as above described, the buffing takes place at a rapid rate. The back and forth reciprocation of the work through the narrow range $e$ is accommodated by lateral deflection of the peripheries of the fabric disks 17 at the sides of the wheel groove rather than by slipping of the edges of the work over and past the disks defining the side walls 28$^a$ and 29$^a$ of the grooves. As a result, the edge surfaces 16$^a$ of the work, even though disposed substantially at right angles to the wheel axis, remain at all times in contact with the sides of the same fabric disks and therefore are always polished effectually.

The surfaces 28 and 29 of the wheel need not be contoured precisely to the shape of the work at the outset. That is to say, with the abrasive type of buffing liquid delivered onto the wheel periphery, the contour of the latter to precisely match that of the workpieces to be buffed will be perfected gradually in service use after which a high degree of uniformity of pressure between the work and buffing wheel will be achieved. In view of this and the close mating of the wheel and work surfaces, the desired polish can be produced with minimum pressure and therefore a corresponding reduction in the rate of wear on the wheel. To maintain such light pressure, the work support is fed forwardly from time to time so as to maintain the desired area $d$ of contact and therefore the frequency of oscillation of the work to avoid any possibility of streaking of the polished surface.

Because the range $e$ of such oscillation of the work is so short, the perfected contour of the buffing wheel is preserved as the wheel wears away in service use. Thus, as illustrated in FIG. 9, the diameter of the surfaces 28, 29 decreases progressively but the width of these surfaces remains constant as the wearing continues. That is to say, the fabric disks 17 defining the side walls of the wheel grooves merely bend laterally during oscillation of the work and are not worn away as the groove diameter decreases. From time to time, the unworn wheel disks beyond the edges of the grooves are cut away to avoid interfering with the parts of the work fixtures.

The improved results enumerated above are achieved by oscillating the work through a range $e$ (FIG. 8) of no more than $5/32$ of an inch. For this purpose, each follower 64 is sized and the cam surfaces 69 are shaped and spaced so as to produce the desired range of oscillation which preferably is $3/32$ of an inch. Wearing of the cams and follower reduces the length of this range without appreciably increasing the swelling of the work in the course of its oscillation. When this range has, by wearing of the cams, decreased to about $1/32$ of an inch, the cams and followers are renewed.

The machine above described may be adapted for buffing many different work shapes simply by substituting wheels of the proper contour and proper holding fixtures. For example, to buff the end surface 75 of the workpiece 76 shown in FIG. 12, a wheel grooved as indicated at 77 in FIG. 11 would be employed. By providing several fixtures on each of the bars 30, a corresponding number of pieces may be buffed simultaneously thus increasing the capacity of the machine.

With the buffing machine constructed and operated as above described, it has been possible to produce a high polish on many shapes of work without any danger of streaking. At the same time, the service life of the buffing wheel is increased substantially by virtue of the extremely light contact employed, the wheel being worn down only one half of an inch in buffing 25,000 of the workpieces shown in FIG. 1. More important is the great reduction in labor costs. For example, the present invention has made it possible to produce a superior polish on the workpiece shown in FIG. 1 for a small fraction of the former cost using hand supported fixtures, the best method heretofore devised for this particular workpiece.

We claim as our invention:

1. A machine for buffing a non-planar surface on a workpiece having, in combination, a rotary buffing wheel composed of laminated fabric and having a periphery complementing the contour of said surface, an endless power driven conveyor comprising two endless belts, parallel bars secured at opposite ends to said belts and spaced uniformly along the latter, fixtures on the respective bars for supporting workpieces, and pulleys supporting said belts for movement of said workpieces tangentially past and in closely mating contact with a short arcuate portion of the periphery of said wheel, guides holding said bars in a fixed plane during such contact while permitting endwise reciprocation of each bar by lateral flexing of said belts, a follower on each of said bars, and a stationary cam track extending along said belts and engaging the respective followers on opposite sides thereof, each of said cams being shaped to move the passing bar back and forth through a narrow range and a plurality of times while the workpiece thereon is in contact with said wheel.

2. A machine for buffing a non-planar surface on a workpiece having, in combination, a rotary buffing wheel composed of laminated fabric and having a periphery complementing the contour of said surface, a power driven conveyor comprising two endless chains, parallel bars secured at opposite ends to said chains and spaced uniformly along the latter, fixtures on the respective bars for supporting workpieces, and sprockets supporting said belts for movement of said workpieces tangentially past and in closely mating contact with a short arcuate portion of the periphery of said wheel, guides holding said bars in a fixed plane during such contact while permitting endwise reciprocation of each bar by lateral flexing of said chains, a follower on each of said bars and a stationary cam track extending along the path of said bars opposite said wheel and engaging the respective followers, each of said cams being shaped to move each of said bars back and forth through a narrow range and a plurality of times while the workpiece thereon is in contact with said wheel.

3. A buffing machine as defined in claim 2 in which said chains having links of uniform pitch and said followers are spaced apart along the chains a distance which is an even multiple of said chain pitch.

4. A buffing machine as defined in claim 2 in which each of said cam tracks comprises a pair of opposed edges each having a succession of arcs with the adjacent arcs intersecting at points respectively disposed midway between the points on the opposed edge, and each of said followers being sized to pass freely between each of said points and the bottom of the opposed arc.

5. A machine for buffing a workpiece having a non-planar surface of irregular contour along one dimension, said machine having in combination, a rotary buffing wheel longer than said dimension composed of a stack of fabric disks clamped tightly together around their centers so as to allow for lateral bending of the free outer peripheral portion of the disks, the periphery of said wheel being contoured longitudinally of the wheel to provide a buffing ssurface of a cross-section closely complementing said irregular contour of said non-planar surface, a conveyor supporting said workpiece for bodily movement along a path extending transversely of said dimension and tangentially past said wheel periphery while holding said non-planar surface and said buffing surface under light pressure and in closely mating contact over a short arc of the wheel periphery, means for driving said conveyor to move the supported workpiece along said path, and mechanism operable while each point on said non-planar surface is in said mating contact with said buffing surface to reciprocate the workpiece back and forth along said wheel axis more than four times and through a range of less than five thirty-seconds of an inch and thereby limit the lateral bending of the free edge portions of said fabric disks whereby to preserve the irregular contour of said buffing surface as said fabric disks wear away in service use.

6. A machine for buffing a workpiece having a non-planar surface of irregular contour along one dimension, said machine having in combination, a rotary buffing wheel longer than said dimension composed of a stack of fabric disks clamped tightly together around their centers so as to allow for lateral bending of the free outer peripheral portion of the disks, the periphery of said wheel being contoured longitudinally of the wheel to provide a buffing surface of a cross-section closely complementing said irregular contour of said non-planar surface, a conveyor supporting said workpiece for bodily movement along a path extending transversely of said dimension and tangentially past said wheel periphery while holding said non-planar surface and said buffing surface under light pressure and in closely mating contact over a short arc of the wheel periphery, means for driving said conveyor to move the supported workpiece along said path, and mechanism operable while each point on said non-planar surface is in said mating contact with said buffing surface to reciprocate the workpiece back and forth along said wheel axis a plurality of times and through a range of between one thirty-second and five thirty-seconds of an inch whereby to preserve the irregular contour of said buffing surface as said disks wear away in service use.

7. A machine for buffing two non-planar surfaces of different irregular contours on different sides of each of a succession of workpieces having, in combination, rotary buffing wheels arranged end to end along a common shaft and composed of a stack of fabric disks clamped tightly together at their centers so as to allow for lateral bending of the free outer peripheral edge portions of the disks, the peripheries of the respective wheels being contoured differently in a direction longitudinally of said shaft to provide buffing surfaces closely complementing said irregular contours of the corresponding workpieces, an endless conveyor movable along a path disposed adjacent and extending transversely of said wheels in a generally tangent direction, two rows of fixtures carried by and laterally spaced apart across said conveyor with the fixtures of each row spaced along the conveyor, one of said fixtures being constructed to receive and detachably secure said workpieces to said conveyor in a predetermined position for engagement of the pieces with a short arc of one of said wheels and for close mating contact between one of said non-planar surfaces and the correspondingly contoured buffing surface during such contact, the other fixture being constructed to receive and secure the workpieces of the other row in different predetermined positions for similarly presenting the other surfaces of the workpieces in the second of said rows in similar close mating contact with the other buffing surface whereby the workpieces may be transferred manually from one of said rows to the other in approaching said buffing wheels and both of said work surfaces are buffed in two passes across said wheels, and mechanism operable while said workpieces are engaging said wheels to reciprocate said conveyor and the workpieces in both of said rows along said shaft and through a range sufficiently short to be accommodated by lateral flexure of said wheel disks and thereby preserve the different contours of both of said buffing surfaces during wearing down of the wheel disks in service use.

References Cited in the file of this patent

UNITED STATES PATENTS

| | | |
|---|---|---|
| 1,652,436 | Halladay | Dec. 13, 1927 |
| 1,788,249 | Philippi | Jan. 6, 1931 |
| 2,073,786 | Doutt | Mar. 16, 1937 |